(12) United States Patent
Zhou (10) Patent No.: US 7,072,834 B2
(45) Date of Patent: Jul. 4, 2006

(54) ADAPTING TO ADVERSE ACOUSTIC ENVIRONMENT IN SPEECH PROCESSING USING PLAYBACK TRAINING DATA

(75) Inventor: Guojun Zhou, Portland, OR (US)

(73) Assignee: Intel Corporation, Santa Clara, CA (US)

(*) Notice: Subject to any disclaimer, the term of this patent is extended or adjusted under 35 U.S.C. 154(b) by 583 days.

(21) Appl. No.: 10/115,934

(22) Filed: Apr. 5, 2002

(65) Prior Publication Data
US 2003/0191636 A1 Oct. 9, 2003

(51) Int. Cl.
*G10L 15/06* (2006.01)
*G10L 15/20* (2006.01)
*G10L 21/00* (2006.01)

(52) U.S. Cl. .................... 704/244; 704/233; 704/270
(58) Field of Classification Search ................ 704/226, 704/248; 395/2.41
See application file for complete search history.

(56) References Cited

U.S. PATENT DOCUMENTS

| | | | |
|---|---|---|---|
| 5,475,792 A * | 12/1995 | Stanford et al. | ............ 704/233 |
| 5,737,485 A * | 4/1998 | Flanagan et al. | ........... 704/232 |
| 5,960,397 A * | 9/1999 | Rahim | ........................ 704/244 |
| 6,912,417 B1 * | 6/2005 | Bernard et al. | ............... 604/20 |
| 2003/0061037 A1 * | 3/2003 | Droppo et al. | .............. 704/226 |

OTHER PUBLICATIONS

Stahl et al., "Acoustic synthesis of training data for speech recognition in living room environments", ICASSP '01, May 7-11, 2001, vol. 1, pp.: 285-288.*
Reynolds, "HTIMIT and LLHDB: speech corpora for the study of handset transducer effects", ICASSP-97, Apr. 21-24, 1997, vol. 2, pp.: 1535-1538.*

* cited by examiner

*Primary Examiner*—W. R. Young
*Assistant Examiner*—Brian L. Albertalli
(74) *Attorney, Agent, or Firm*—Guojun Zhou (57) ABSTRACT

An arrangement is provided for an automatic speech recognition mechanism to adapt to an adverse acoustic environment. Some of the original training data, collected from an original acoustic environment, is played back in an adverse acoustic environment. The playback data is recorded in the adverse acoustic environment to generate recorded playback data. An existing speech model is then adapted with respect to the adverse acoustic environment based on the recorded playback data and/or the original training data.

20 Claims, 8 Drawing Sheets

ADAPTING TO ADVERSE ACOUSTIC ENVIRONMENT IN SPEECH PROCESSING USING PLAYBACK TRAINING DATA

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to automated speech processing. Other aspects of the present invention relate to adaptive automatic speech recognition.

In a society that is becoming increasingly "information anywhere and anytime", voice enabled solutions are often deployed to provide voice information services. For example, a telephone service company may offer a voice enabled call center so that inquiries from customers may be automatically directed to appropriate agents. In addition, voice information services may be necessary to users who communicate using devices that do not have a platform on which information can be exchanged in conventional textual form. In these applications, an automatic speech recognition system may be deployed to enable voice-based communications between a user and a service provider.

Automatic speech recognition systems usually rely on a plurality of automatic speech recognition models trained based on a given corpus, consisting of a collection of speech from diversified speakers recorded in one or more different acoustic environment. The speech models built based on such given corpus capture both the characteristics of spoken words and that of the acoustic environment in which the spoken words are uttered. The accuracy of an automatic speech recognition system depends on the appropriateness of the speech models it relies on. In other words, if an automatic speech recognition system is deployed in an acoustic environment similar to the acoustic environment in which the training corpus is collected, the recognition accuracy tends to be higher than when it is deployed in a different acoustic environment. For example, if speech models are built based on a training corpus collected in a studio environment, using these speech models to perform speech recognition in an outdoor environment may result in very poor accuracy.

An important issue in developing an automatic speech recognition system that may potentially be deployed in an adverse acoustic environment involves how to adapt underlying speech models to an (adverse) acoustic environment. There are two main categories of existing approaches to adapt an automatic speech recognition system. One is to re-train the underlying speech models using new training data collected from the deployment site (or adverse acoustic environment). With this approach, both the original training corpus and speech models established therefrom are completely abandoned. In addition, to ensure reasonable performance, it usually requires a new corpus of a comparable size. This often means that a large amount of new training data needs to be collected from the adverse acoustic environment at the deployment site.

A different approach is to adapt, instead of re-training, speech models established based on an original corpus. To do so, a relatively smaller new corpus needs to be generated in an adverse acoustic environment. The new corpus is then used to determine how to adapt existing speech models (via, for example, changing the parameters of the existing models). Although less effort may be required to collect new training data, the original corpus is also put in no use.

Collecting training data is known to be an expensive operation. The need of acquiring new training data at every new deployment site not only increases the cost but also often frustrates users. In addition, in some situations, it may even be impossible. For example, if a speech recognition system is installed on a hand held device which is used by military personnel in battlefield scenarios, it may be simply not possible to re-collect training data at every locale. Furthermore, abandoning an original corpus, which is collected with high cost and effort, wastes resources.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
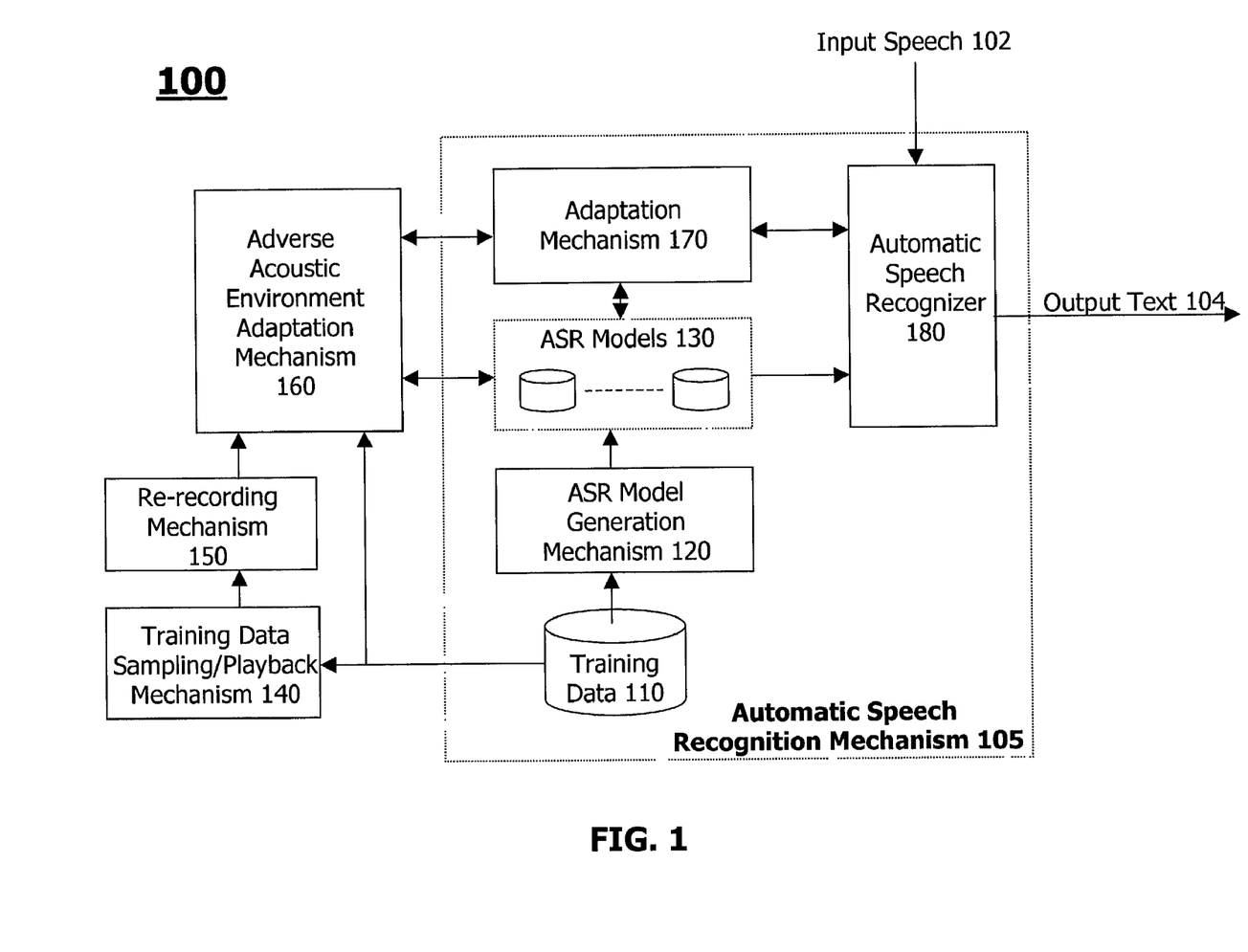
FIG. 1 depicts a framework that facilitates an automated speech recognition mechanism to adapt to an adverse acoustic environment based on playback speech training data, according to embodiments of the present invention.

FIG. 1 depicts a framework 100 that facilitates an automated speech recognition mechanism 180 to adapt to an adverse acoustic environment, according to embodiments of the present invention. The framework 100 comprises an automatic speech recognition mechanism 105, a training data sampling and playback mechanism 140, a re-recording mechanism 150, and an adverse acoustic environment adaptation mechanism 160. The automatic speech recognition mechanism 105 takes input speech 102 as input and generates output text 104 as output. The output text 104 represents the textual information automatically transcribed, by the automatic speech recognition mechanism 105, from the input speech 102.

The automatic speech recognition mechanism 105 includes a set of training data 110, an automatic speech recognition (ASR) model generation mechanism 120, a set of ASR models 130, an automatic speech recognizer 180, and an adaptation mechanism 170. Automatic speech recognition is usually performed according to some pre-established models (e.g., ASR models 130). Such models may characterize speech with respect to different aspects. For example, the linguistic aspect of speech may be modeled so that the grammatical structure of a language may be properly characterized. The pronunciation aspect of speech may be characterized using an acoustic model, which is specific to a particular language.

Figure 2:
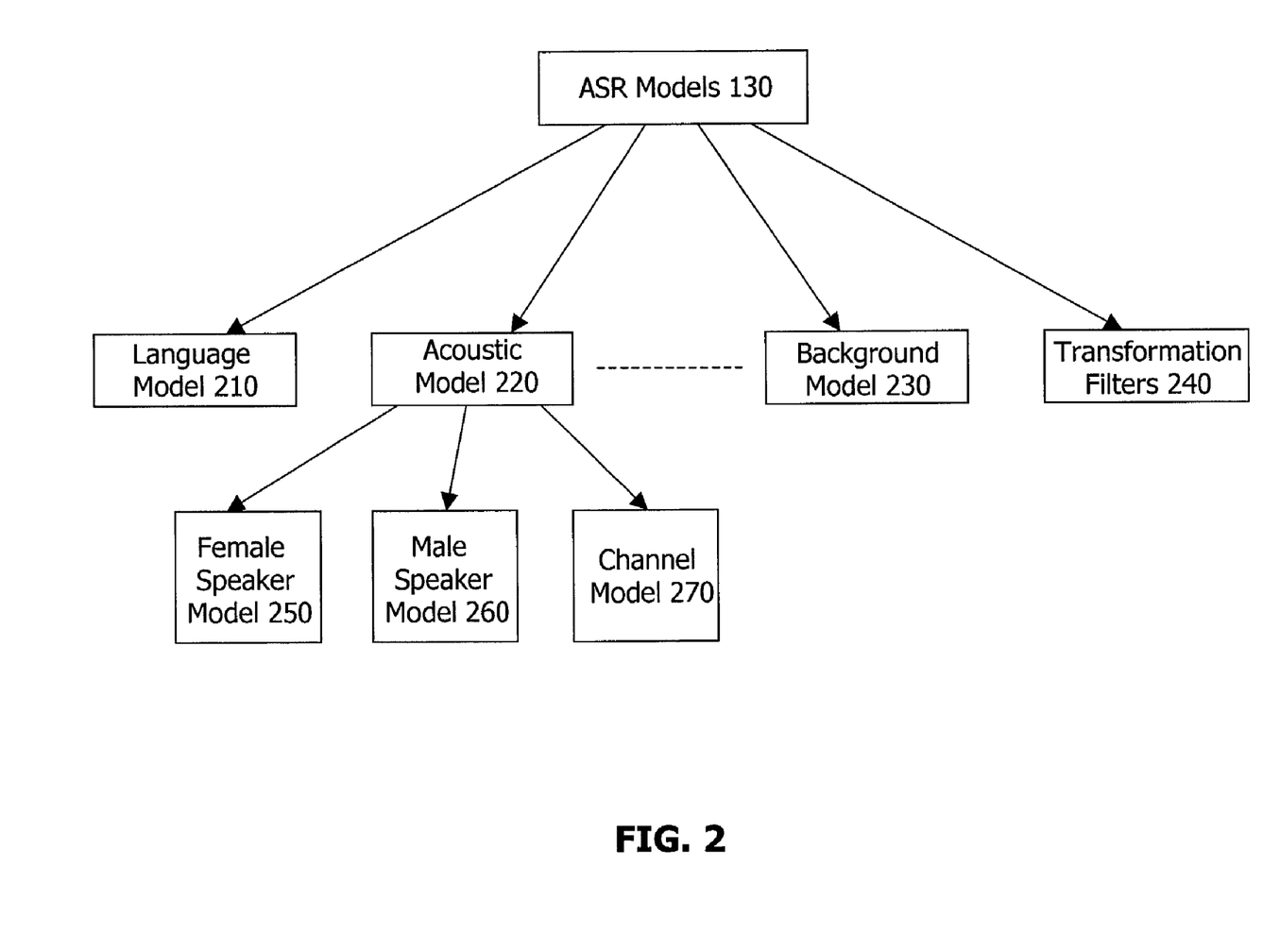
FIG. 2 illustrates exemplary types of automatic speech recognition models.

FIG. 2 illustrates exemplary types of automatic speech recognition models. The ASR models 130 may include a language model 210, an acoustic model 220, . . . , a background model 230, and one or more transformation filters 240. The acoustic model 220 may describe spoken words of a particular language in terms of phonemes. That is, each spoken word is represented as a sequence of phonemes. The acoustic model 220 may further include a plurality of specific acoustic models. For example, it may include a female speaker model 250, a male speaker model 260, or models for different speech channels 270. Creating separate female and male speaker models may improve the performance of the automatic speech recognizer 180 due to the fact that speech from female speakers usually present different features than that of male speakers. Modeling different speech channels may achieve the same (improve performance). Speech transmitted over a phone line may present very different acoustic characteristics from that recorded in a studio.

The background model 230 may characterize an acoustic environment in which spoken words in the speeches in the training data 110 are uttered and recorded. An acoustic environment corresponds to the acoustic surroundings, which may consist of environmental sound or background noises. For example, near the lobby of a hotel, the acoustic surrounding may consist of background speech from the people in the lobby and some music played. At a beach site, acoustic surroundings may include sound of wave and people's voice in the background. The training data 110 is usually a combination of background sound and dominant speech, which may be modulated on top of the background sound. From the training data 110, a background model may be derived from the portions of the training data 110 where dominant speech is not present.

The transformation filters 240 may be generated to map an ASR model to a new ASR model. For example, a transformation filter may be applied to an existing acoustic model to yield a different acoustic model. A transformation filter may be derived based on application needs. For example, when acoustic environment changes, some of the ASR models may need to be revised to adapt to the adverse acoustic environment. In this case, the changes with respect to the original acoustic environment may be used to generate one or more transformation filters that may be applied, during speech recognition, to provide the automatic speech recognition mechanism 105 adapted models. This will be discussed in more detail in referring to FIG. 5.

The ASR model generation mechanism 120 creates the ASR models 130 based on the training data 110. The automatic speech recognizer 180 uses such generated models to recognize spoken words from the input speech 102. Appropriate ASR models may be selected with respect to the input speech 102. For example, when the input speech 102 contains speeches from a female speaker, the female speaker model 250 may be used to recognize the spoken words uttered by the female speaker. When the input speech 102 represents speech signals transmitted over a phone line, a channel model modeling transmitting medium corresponding to phone lines may be retrieved to assist the automatic speech recognizer 180 to take into account the aspects of transmitting medium during processing.

The adaptation mechanism 170 selects appropriate ASR models according to the nature of the input speech 102. The automatic speech recognizer 180 may first determine whether the input speech 102 contains speech from male or female speakers. Such information is used by the adaptation mechanism 170 to select proper ASR models. The input speech 102 may also contain different segments of speech, some of which may be from female speakers and some from male speakers. In this case, the automatic speech recognizer 180 may segment the input speech 102 first, label the segments accordingly, and provide the segmentation results to the adaptation mechanism 170 to select appropriate ASR models.

The automatic speech recognition mechanism 105 may be deployed at different sites. A deployment site may have an acoustic environment that is substantially similar to the acoustic environment in which the training data 110 is collected. It may also correspond to an acoustic environment that is substantially different (adverse) from the original acoustic environment in which the training data 110 is collected. Without adaptation, the performance of the automatic speech recognizer 180 may depend on how similar an adverse acoustic environment is to the original acoustic environment. To optimize the performance in an adverse acoustic environment, the ASR models 130 may be adapted to reflect the change of the underlying acoustic environment. Such changes may include the noise level change in the underlying speech environment or the change in noise type when a different type of microphone is used.

FIG. 3(a) presents an exemplary segment of speech data collected in an original acoustic environment. The segment of speech data is illustrated in waveform. FIG. 3(b) presents an exemplary segment corresponding to the same speech data, but played back and recorded in an adverse acoustic environment. As seen in the plots in FIG. 3(a) and FIG. 3(b), the portions of the waveforms corresponding to speech parts (the portion with substantially higher volume) are substantially similar. Yet the background noise seen in the two waveforms seems quite different. The difference represents the change in the adverse acoustic environment. FIG. 3(c) illustrates the discrepancy between the segment of speech data in FIG. 3(a) and its playback version recorded in the adverse acoustic environment. The discrepancy may be computed by subtracting one waveform from the other. There may be other means to compute such discrepancy. For example, the discrepancy may also be represented in the form of spectrum.

The discrepancy between the waveforms of the same speech recorded in different acoustic environments may be used to adapt the ASR models 130 (that are established based on the training data 110 recorded in an original acoustic environment) to the adverse acoustic environment. To do so, the training data sampling and playback mechanism 140 (see FIG. 1) may select part or the entire set of the training data 110 and play back the selected part of the training data 110 in the adverse acoustic environment. The re-recording mechanism 150 then records the playback training data in the adverse acoustic environment. An adverse acoustic environment may correspond to a particular physical locale in which the surrounding sound, the device used to playback the selected training data, as well as the equipment used to record the playback training data may all attribute to the adverse acoustic environment. To achieve optimal performance, the environment in which the training data is played back and re-recorded may be set up to match the environment in which the input speech 102 is to be collected. For example, a microphone that is the same type as that to be used in generating the input speech 102 may be used.

Figure 4:
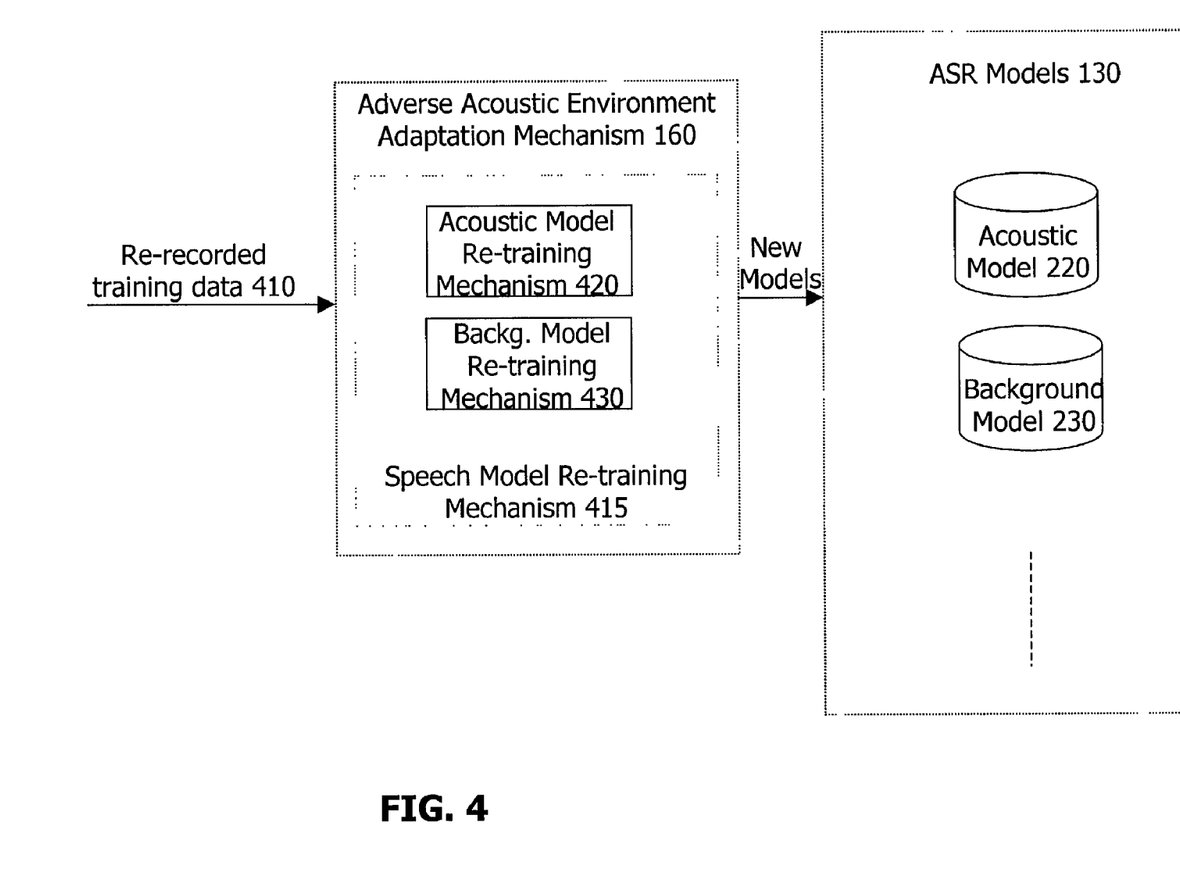
FIG. 4 is a high level functional block diagram of an exemplary embodiment of an adverse acoustic environment adaptation mechanism.

With the re-recorded playback training data, the adverse acoustic environment adaptation mechanism 160 updates the ASR models 130 so that they appropriately characterize the adverse acoustic environment. There may be different means to adapt. Specific means to adapt may depend on particular applications. FIG. 4 depicts a high level functional diagram of an exemplary implementation of the adverse acoustic environment adaptation mechanism 160. In this exemplary embodiment, the adverse acoustic environment adaptation mechanism 160 utilizes playback training data recorded in an adverse acoustic environment to re-train relevant ASR models. For example, both the acoustic model 220 and the background model 230 may be re-trained based on the re-recorded playback training data.

In this embodiment, the adverse acoustic environment adaptation mechanism 160 may be realized with a speech model re-training mechanism 415, which comprises at least some of an acoustic model re-training mechanism 420 and a background model retraining mechanism 430. Both the acoustic model re-training mechanism 420 and the background model re-training mechanism 430 use the re-recorded playback training data 410 as input to train an underlying model. During the re-training process, both the acoustic model re-training mechanism 420 and the background model re-training mechanism 430 attempt to capture the characteristics of the adverse acoustic environment and accordingly generate appropriate models. The functionalities of the acoustic model re-training mechanism 420 and the background model re-training mechanism 430 may be substantially the same as that of the corresponding portion of the ASR model generation mechanism 120, except the training data used is different. They may also invoke certain part of the ASR model generation mechanism 120 to directly utilize existing capabilities of the automatic speech recognition mechanism 105 to perform re-training tasks.

The new models generated during a re-training session are used to either replace the original models or stored as separate set of models (so that each set of models is used for a different acoustic environment).

Figure 5:
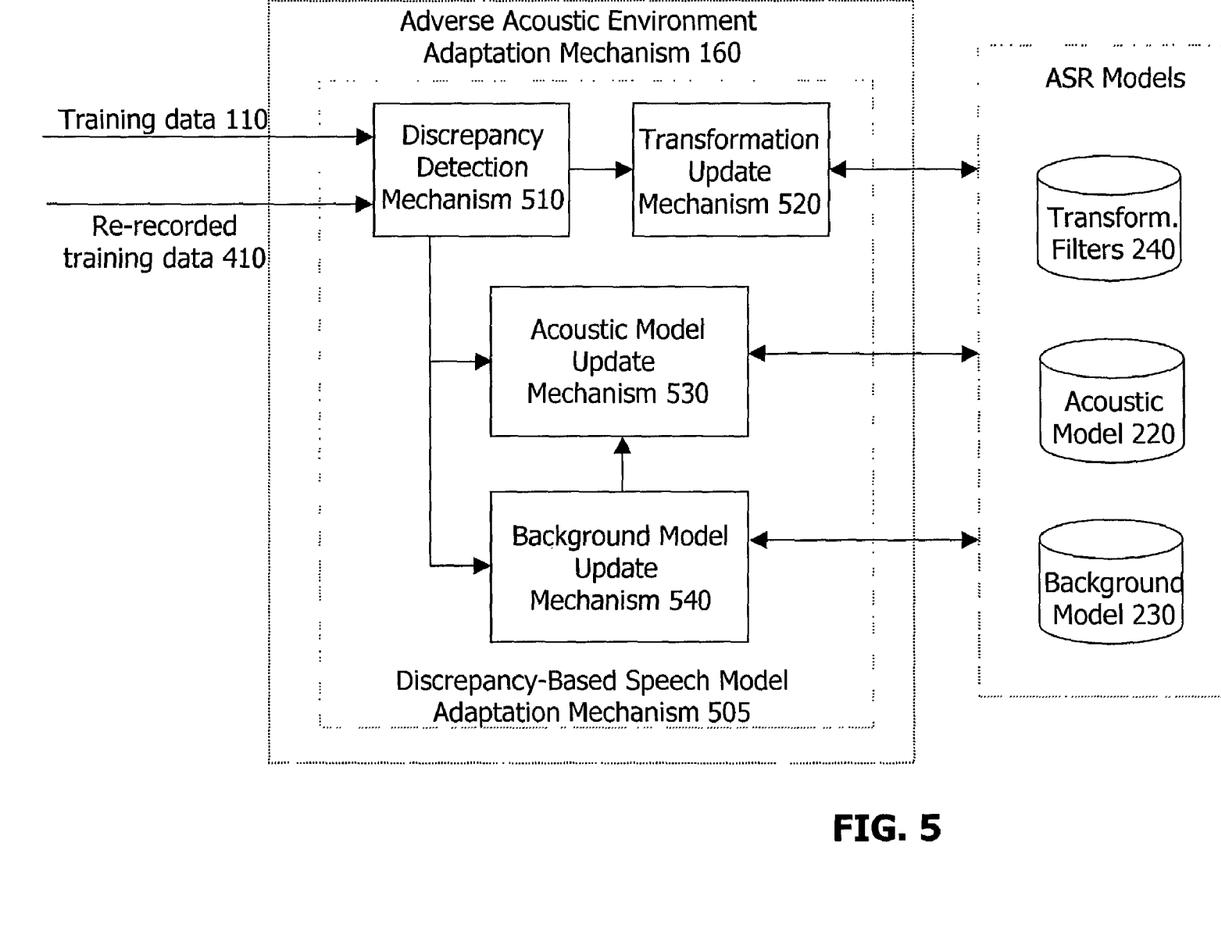
FIG. 5 is a high level functional block diagram of another exemplary embodiment of an adverse acoustic environment adaptation mechanism.

A different means to adapt to an adverse acoustic environment is to update or revise existing ASR models, instead of re-generate such models. In this case, discrepancy between the original training data 110 and its playback version may be used to determine how relevant existing ASR models may be revised to reflect the changes in an adverse acoustic environment. FIG. 5 depicts a high level functional diagram of a different exemplary embodiment of the adverse acoustic environment adaptation mechanism 160 that adapts the ASR models to an adverse acoustic environment via updating existing models. The adverse acoustic environment adaptation mechanism 160, in this case, may be implemented with a discrepancy based speech model adaptation mechanism 505, comprising at least some of a discrepancy detection mechanism 510, a transformation update mechanism 520, an acoustic model update mechanism 530, and a background model update mechanism 540.

An ASR model, including an acoustic model or a background model, may be typically represented by a set of model parameters. For example, a Gaussian mixture may be used as a background model to characterize an acoustic environment (background). In this case, the parameters of the Gaussian mixture (normally including a set of mean vectors and covariance matrices) describe a distribution in a high dimensional feature space that models the distribution of acoustic features computed from the underlying acoustic environment. One type of such acoustic features is the cepstral feature computed from training data. Background models generated from different acoustic environments may be distinguishable from the difference in their model parameter values. Similarly, since an acoustic environment may also affect acoustic models, acoustic models derived with respect to one acoustic environment may differ from those derived from an adverse acoustic environment. The difference may be reflected in their model parameter values.

Two exemplary different means of adapting an existing model are described below. An existing model may be updated directly to produce an adapted model. This means that the parameters of an existing model may be revised according to some criteria. Another means to adapt an existing model is to devise a transformation (filter) to map existing model parameter values to transformed model parameter values that constitute an adapted model. For example, a linear transformation may be devised and applied to each existing model parameter to produce new model parameters. A transformation may be devised according to some criteria. Both the criteria used to revise model parameters and the criteria used to devise a transformation may be determined with respect to the acoustic environment changes. For example, the discrepancy between the original acoustic environment and the present adverse acoustic environment may be used to determine how an ASR model should adapt.

The discrepancy detection mechanism 510 computes the discrepancy between the original training data 110 (from an original acoustic environment) and the re-recorded training data 410 (from an adverse acoustic environment). Based on the discrepancy, the acoustic model update mechanism 530 revises the parameters of the existing acoustic model 220 to produce an updated (or adapted) acoustic model that is appropriate to the present adverse acoustic environment. Similarly, the background model update mechanism 540 revises the parameters of the existing background model 230 (if any) to produce an updated background model.

The first exemplary means of adapting an existing model in an adverse acoustic environment is to directly update model parameters based on given new training data recorded in an adverse acoustic environment. That is, based on the re-recorded training data 410, the acoustic model update mechanism 530 or the background model update mechanism 540 may directly revise the parameter values of the underlying existing models based on detected discrepancy between the original training data 110 and the re-recorded training data 410. Existing techniques may be used to achieve this task. For instance, if an existing ASR model is a Gaussian mixture, a known technique called maximum aposteriori estimation (MAP) may be used to adapt its model parameters, including mean vectors and covariance matrices, in accordance with the discrepancy between the original acoustic environment and the adverse acoustic environment.

Another approach to adapt existing model parameters is to integrate existing models with updated background models. For example, since the detected discrepancy may represent mainly the difference in two different acoustic environments, such discrepancy may be used to update an existing background model or to change the parameter values of the existing background model. Such updated background model may then be integrated with the existing acoustic model to generate an updated acoustic model corresponding to the adverse environment. Existing techniques may be applied to achieve the integration. For example, parallel model combination (PMC) approach combines a background noise model represented as a Gaussian mixture with existing noise-free acoustic models to generate models for noisy speech.

The second exemplary means of adapting an existing model in an adverse acoustic environment is to devise an appropriate transformation (e.g., transformation filters 240), which transforms the parameter values of an existing model to produce an adapted model. Such transformation may be applied to each of the model parameters. For example, assume a Gaussian mixture is used for an existing acoustic model and each Gaussian in the mixture is characterized by a mean vector and a covariance matrix. The mean vectors and the covariance matrices of all Gaussians (model parameters) constitute an acoustic model. Here a mean vector of a Gaussian may correspond to the mean of certain features such as the cepstral features that are computed from the training data 110.

Figure 3:
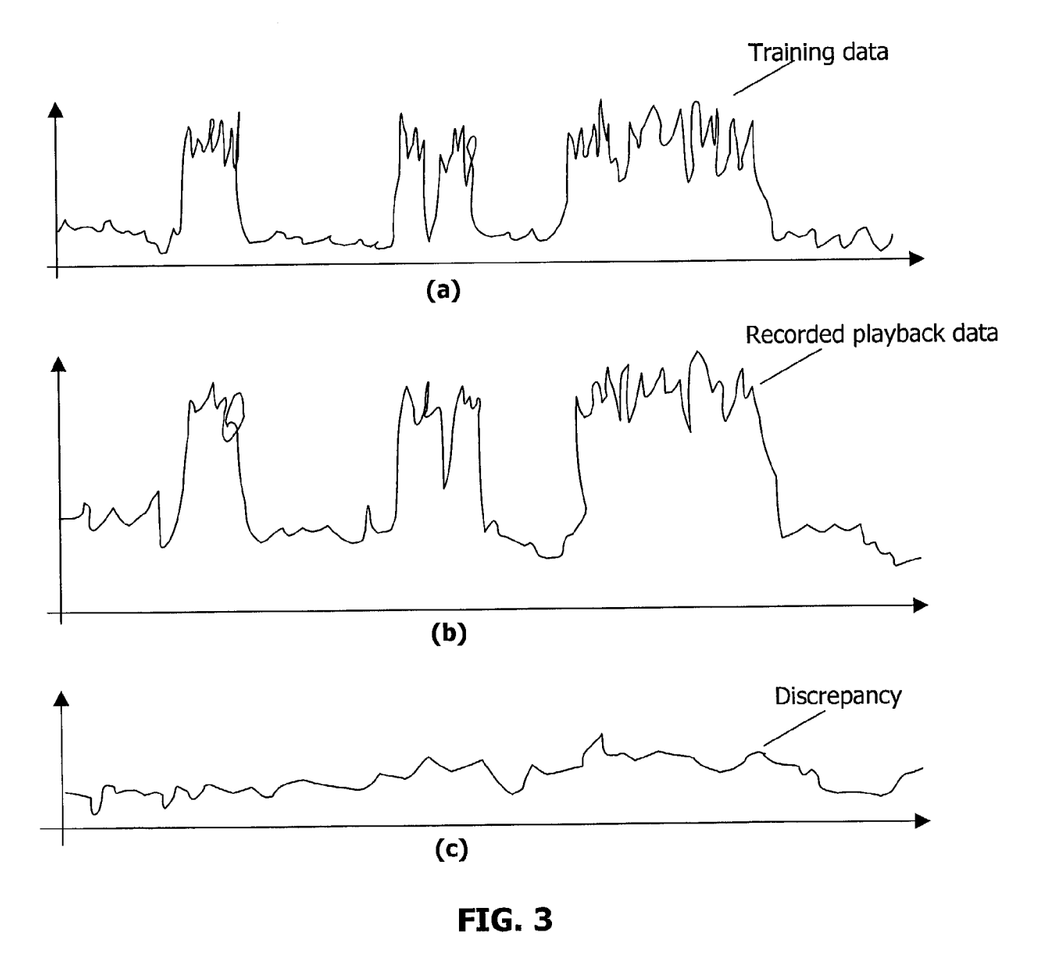
FIG. 3(a) is an exemplary segment of speech training data in waveform.
FIG. 3(b) is an exemplary segment of playback speech training data recorded in an adverse acoustic environment.
FIG. 3(c) is an exemplary discrepancy between a segment of speech training data and its playback recorded in an adverse acoustic environment, according to an embodiment of the present invention.

To adapt a Gaussian mixture model with known model parameter values to another Gaussian mixture with different model parameter values, a linear transformation may be devised and applied to the mean vectors and covariance matrices of the original Gaussian mixture. The transformed mean vectors and covariance matrices effectively yield a new Gaussian mixture corresponding to a different distribution in a high dimensional feature space. Such a linear transformation may be derived according to both the existing model and the discrepancy (between the original training data 110 and the re-recorded training data 410). Different techniques may be used to derive a linear transformation. For example, maximum likelihood linear regression (MLLR) is a known technique to derive an appropriate linear transformation based on the discrepancy between training data, recorded in one acoustic environment (e.g., the original training data 110), and training data, recorded in an adverse acoustic environment (e.g., the re-recorded training data 410 as shown in FIG. 3).

Model parameters may also be transformed via a non-linear means. A non-linear transformation may be derived using existing techniques. For example, codeword dependent cepstral normalization (CDCN) is a technique that applies a linear transformation on original model parameters by taking into account of the minimum mean square of the cepstral features computed using a log transformation on spectral features.

Different means of adapting an existing model may achieve similar net outcome. For example, transforming model parameters to derive new parameters may yield substantially the same new model parameter values as what can be derived from directly changing the model parameters. In applications, the choice of the means to adapting model parameters may be determined based on specific system set up or other considerations.

Different mechanisms in the adverse acoustic environment adaptation mechanism 160 may be properly invoked according to the adaptation strategy. If existing model parameters are to be revised directly, the acoustic model update mechanism 530 and the background model update mechanism 540 (if any background model is present) may be invoked. The adapted model generated may be stored either separately from the corresponding existing models or used to replace the corresponding existing model.

If existing models are to be adapted through proper transformations, the transformation update mechanism 520 may be invoked. The transformation generated may be stored in the transformation filters 240. In this case, whenever the ASR models are needed in speech processing, appropriate transformation filters may need to be retrieved first and then transformed prior to being applied in speech recognition processing. A different strategy in implementation may be to apply a derived transformation as soon as it is generated to an existing model to produce a new model, which is then stored either separately from the corresponding existing model or to used to replace the existing model.

Different mechanisms in the second embodiment of the adverse acoustic environment adaptation mechanism 160 may also work together to achieve the adaptation. For example, a derived transformation may be sent to appropriate mechanisms (e.g., either the acoustic model update mechanism 530 or the background model update mechanism 540) so that the transformation is applied to an existing model to generate a new model. In a third embodiment of the present invention, the first embodiment of the adverse acoustic environment adaptation mechanism 160 described earlier (adaptation via re-training ASR models) may be integrated with the second embodiment so that different strategies of adaptation can be all made available. The determination of an adaptation strategy in a particular application may be dynamically made according to considerations such as the deployment setting and the specific goals of the application.

Figure 6:
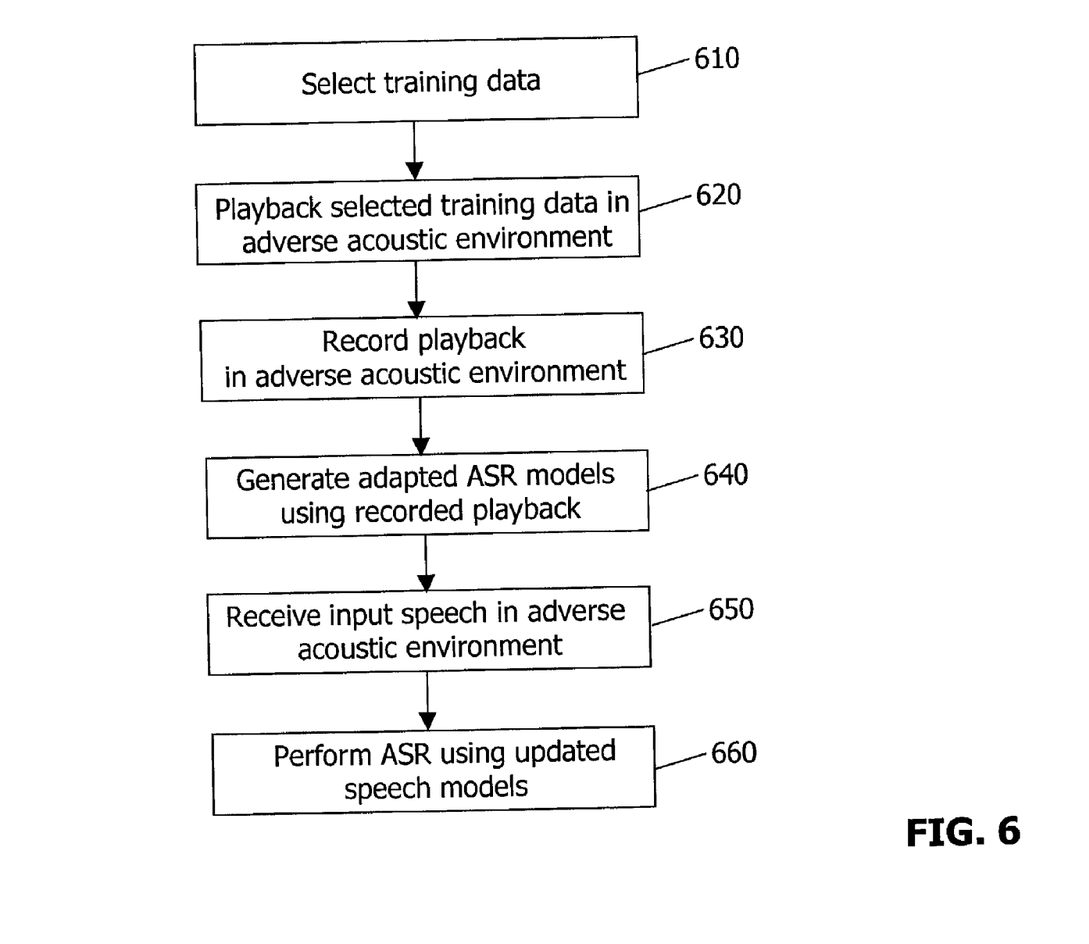
FIG. 6 is a flowchart of an exemplary process, in which an automatic speech recognition framework adapts to an adverse acoustic environment based on playback speech training data, according to an embodiment of the present invention.

FIG. 6 is a flowchart of an exemplary process, in which the automatic speech recognition framework 100 adapts to an adverse acoustic environment based on playback training data recorded in an adverse acoustic environment, according to an embodiment of the present invention. Part or all of the training data 110 is first selected, at act 610, for playback purposes. Such selected training data is then played back, at act 620, and re-recorded, at act 630, in the adverse acoustic environment to generate the re-recorded training data 410. Based on the re-recorded training data 410, adapted ASR models are generated, at act 640, based on both the original training data 110 and the re-recorded training data 410. With the adapted ASR models, when the automatic speech recognition mechanism 105 receives, at act 650, the input speech 102 produced in the adverse acoustic environment, it performs, at act 660, speech recognition using the adapted ASR models.

Figure 7:
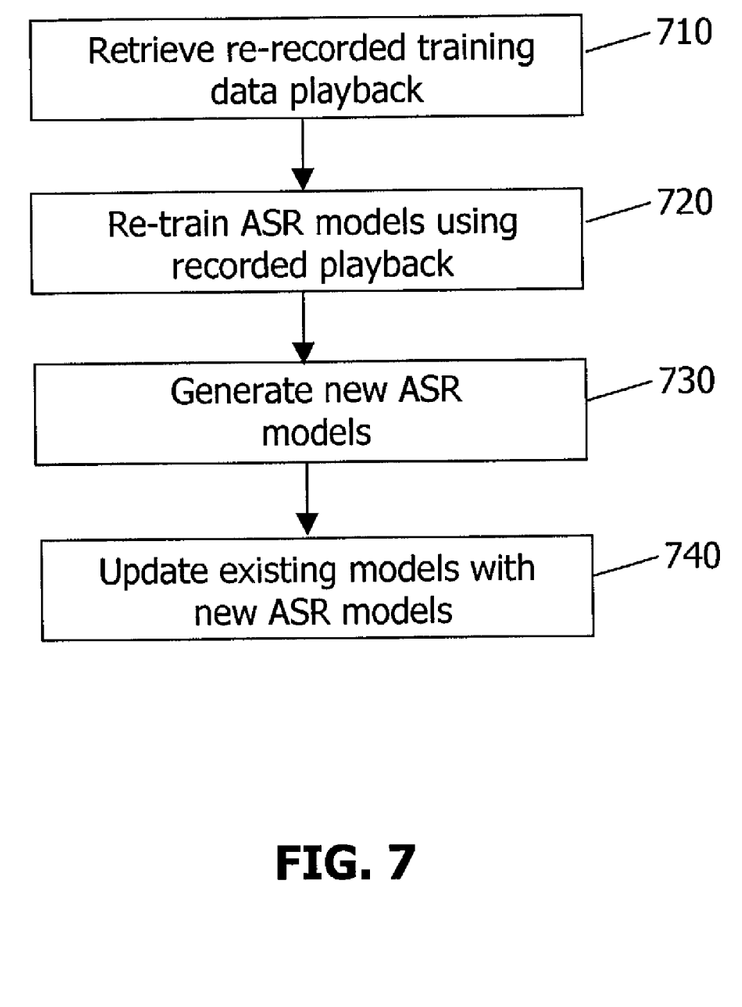
FIG. 7 is a flowchart of an exemplary process, in which playback speech training data recorded in an adverse acoustic environment is used to generate new automatic speech recognition models, according to an embodiment of the present invention.

FIG. 7 is a flowchart of an exemplary process, in which one exemplary embodiment of adverse acoustic environment adaptation mechanism 160 uses playback training data recorded in an adverse acoustic environment to generate adapted ASR models, according to an embodiment of the present invention. The re-recorded training data 410 is first retrieved at act 710. Such data is used to re-train, at act 720, relevant ASR models. New ASR models that adapts to the adverse acoustic environment are generated from the retraining at act 730 and are used to update, at act 740, the existing ASR models.

Figure 8:
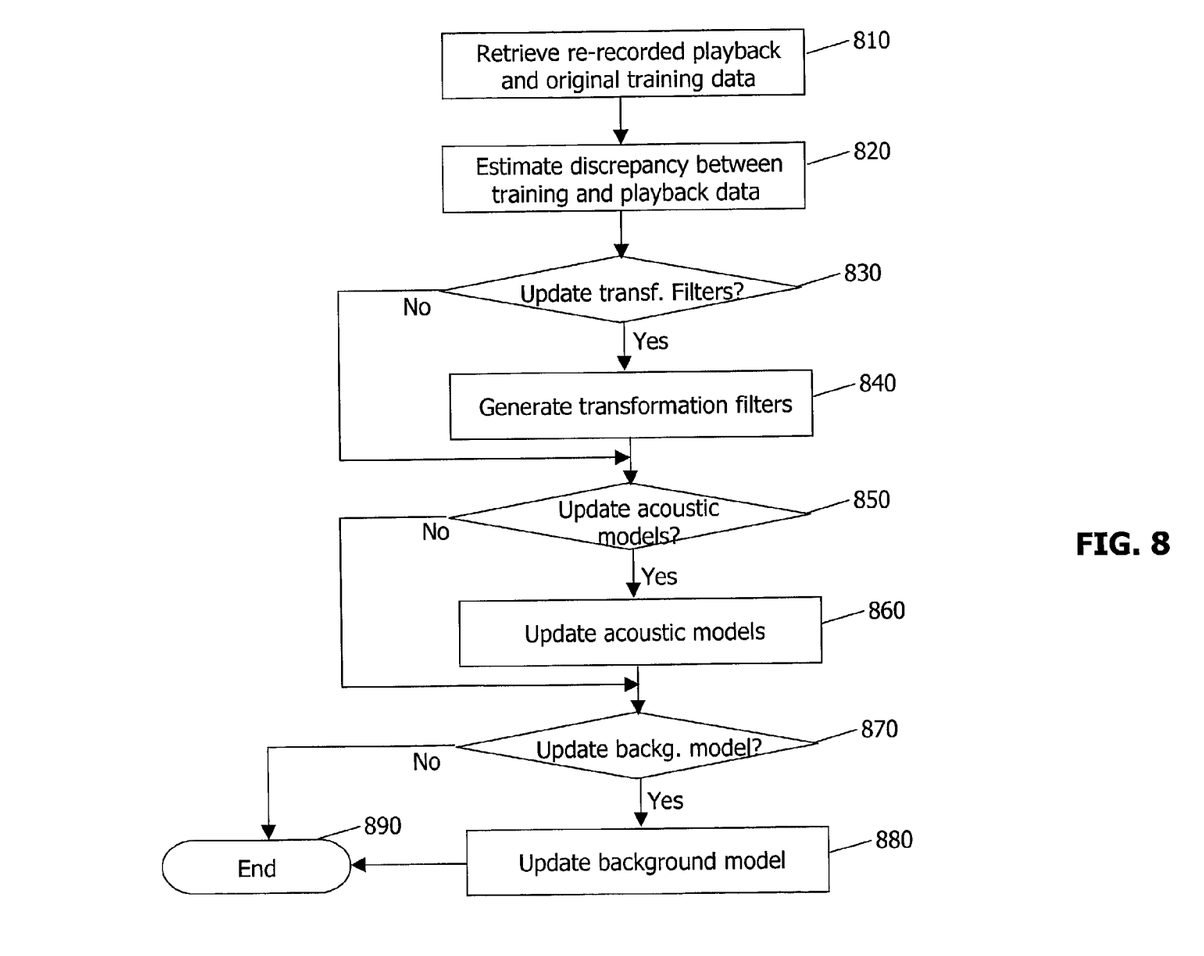
FIG. 8 is a flowchart of an exemplary process, in which discrepancy between original speech training data and its corresponding playback recorded in an adverse acoustic environment and original speech training data is used to adapt existing automatic speech recognition models, according to an embodiment of the present invention.

FIG. 8 is a flowchart of an exemplary process, in which discrepancy between playback speech training data recorded in an adverse acoustic environment and the original speech training data 110 is used to adapt the ASR models 130, according to an embodiment of the present invention. The original training data 110 and the re-recorded training data 410 are first retrieved at act 810. Discrepancy between the original training data 110 and the re-recorded playback training data 410 is estimated at act 820. If appropriate transformations are to be generated, determined at act 830, the transformation update mechanism 520 is invoked to generate, at act 840, transformations that are capable of adapting corresponding existing ASR models to the adverse acoustic environment.

When an existing acoustic model is to be adapted, determined at act 850, the acoustic model update mechanism 530 is invoked to update, at act 860, the existing acoustic model. The update may include either directly revising the parameters of the acoustic model or using a transformation to map the existing acoustic model to a new adapted acoustic model. When an existing background model is to be adapted, determined at act 870, the background model update mechanism 540 is invoked to update, at act 880, the existing background model. Similarly, such update may include either directly revising the parameters of the existing background model or applying a transformation to the existing background model to generate an adapted background model.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments and extends to all equivalent structures, acts, and, materials, such as are within the scope of the appended claims.

What is claimed is:

1. A method for adapting a speech processing system with speech models trained in a first acoustic environment to a second acoustic environment, comprising:

selecting at least a portion of original training data and playing back the selected data in the second acoustic environment to generate playback data, when the speech processing system is used in the second environment, the original training data being collected in the first acoustic environment and used to train the speech models;

recording the playback data in the second acoustic environment to generate recorded playback data; and adapting the speech models from the first acoustic environment to the second acoustic environment based at least in part on the recorded playback data.

2. The method according to claim 1, wherein adapting the speech models comprises re-training at least one of the speech models using at least the recorded playback data.

3. The method according to claim 1, wherein the speech models comprise at least one of:

an acoustic model for describing the acoustic realization of at least one speech sound;

a background model for describing an acoustic environment; or a transformation for altering some property of a given function when the transformation is applied to the function.

4. The method according to claim 1, wherein adapting the speech models comprises:

estimating discrepancy between the original training data and the recorded playback data; and adapting at least one of the speech models from the first acoustic environment to the second acoustic environment based on the discrepancy.

5. The method according to claim 1, further comprising:

receiving input speech collected in the second acoustic environment; and processing the input speech using the adapted speech models.

6. The method according to claim 4, wherein adapting the speech models comprises:

generating a background model based on the original training data and the recorded playback data; and producing a second acoustic model for the second acoustic environment based on the generated background model and a first acoustic model, the first acoustic model being generated using the original training data.

7. The method according to claim 4, wherein adapting the speech models comprises:

deriving a transformation based on the speech models and the discrepancy; and applying the transformation to the speech models to produce the adapted speech models.

8. A system for adapting a speech processing system with speech models trained in a first acoustic environment to a second acoustic environment, comprising:

a training data sampling and playback mechanism for selecting at least a portion of original training data and for playing back the selected data in the second acoustic environment to generate playback data when the speech processing system is used in the second environment, the original training data being collected in the first acoustic environment and used to train the speech models; and an adverse acoustic environment adaptation mechanism for adapting the speech models from the first acoustic environment to the second environment based at least in part on the playback data.

9. The system according to claim 8, wherein the adverse acoustic environment adaptation mechanism comprises:

a speech model re-training mechanism for re-training at least one of the speech models based on at least one of the playback data or the original training data to derive the adapted speech models for the second acoustic environment.

10. The system according to claim 8, wherein the speech processing system comprises an automatic speech recognition mechanism for processing input speech using the adapted speech models.

11. The system according to claim 9, wherein the speech model re-training mechanism comprises at least one of:
an acoustic model re-training mechanism for re-training an acoustic model to adapt to the second acoustic environment based on the playback data; or
a background model re-training mechanism for re-training a background model to adapt to the second acoustic environment based on the playback data.

12. The system according to claim 8, wherein
the adverse acoustic environment adaptation mechanism comprises a discrepancy based speech model adaptation mechanism for adapting an existing speech model to obtain an adapted speech model for the second acoustic environment based on discrepancy between the original training data and the playback data, the existing speech model being derived based on the original training data collected in the first acoustic environment.

13. The system according to claim 12, wherein the discrepancy based speech model adaptation mechanism comprises:
a discrepancy detection mechanism for detecting discrepancy between the original training data and the playback data; and
at least one of:
an acoustic model update mechanism for adapting an existing acoustic model to derive an adapted acoustic model, the existing acoustic model being trained based on the original training data, and the adapted acoustic model being part of the adapted speech models;
a background model update mechanism for updating an existing background model to derive an adapted background model, the existing background model being trained based on the original training data, and the adapted background model being part of the adapted speech models; or
a transformation update mechanism for generating a transformation based on the discrepancy and the existing speech model, the transformation being applied to transform the existing speech model to the adapted speech model.

14. A program code storage device, comprising:
a machine-readable storage medium; and
machine-readable program code, stored on the machine-readable storage medium, the machine readable program code having instructions, which when executed by a computing platform cause:
selecting at least a portion of original training data and playing back the selected data in the second acoustic environment to generate playback data, when the speech processing system is used in the second environment, the original training data being collected in the first acoustic environment and used to train the speech models;
recording the playback data in the second acoustic environment to generate recorded playback data; and
adapting the speech models from the first acoustic environment to the second acoustic environment based at least in part on the recorded playback data.

15. The device according to claim 14, wherein adapting the speech models comprises re-training at least one of the speech models using at least the recorded playback data.

16. The device according to claim 14, wherein the speech models comprise at least one of:
an acoustic model for describing the acoustic realization of at least one speech sound;
a background model for describing an acoustic environment; or
a transformation for altering some property of a given function when the transformation is applied to the function.

17. The device according to claim 14, wherein adapting the speech models comprises:
estimating discrepancy between the original training data and the recorded playback data; and
adapting at least one of the speech models from the first acoustic environment to the second acoustic environment based on the discrepancy.

18. The device according to claim 14, the instructions, when executed, further cause:
receiving input speech collected in the second acoustic environment; and
processing the input speech using the adapted speech models.

19. The device according to claim 17, wherein adapting the speech models comprises:
generating a background model based on the original training data and the recorded playback data; and
producing a second acoustic model for the second acoustic environment based on the generated background model and a first acoustic model, the first acoustic model being generated using the original training data.

20. The device according to claim 17, wherein adapting the speech models comprises:
deriving a transformation based on the speech models and the discrepancy; and
applying the transformation to the speech models to produce the adapted speech models.

* * * * *